US008191951B2

(12) United States Patent
Johnson et al.

(10) Patent No.: US 8,191,951 B2
(45) Date of Patent: Jun. 5, 2012

(54) HIGHLY-EFFICIENT BARREL PLACEMENT DEVICE

(76) Inventors: Clint Johnson, Dousman, WI (US); Steve Gapp, Dousman, WI (US); John Reed Felton, Wauwatosa, WI (US)

( * ) Notice: Subject to any disclaimer, the term of this patent is extended or adjusted under 35 U.S.C. 154(b) by 68 days.

(21) Appl. No.: 12/750,111

(22) Filed: Mar. 30, 2010

(65) Prior Publication Data

US 2011/0243703 A1 Oct. 6, 2011

(51) Int. Cl.
*B25J 15/02* (2006.01)

(52) U.S. Cl. ......... 294/198; 414/739; 414/723; 414/910

(58) Field of Classification Search .................. 294/198, 294/106; 414/739, 722, 723, 724, 686, 910, 414/911
See application file for complete search history.

(56) References Cited

U.S. PATENT DOCUMENTS 3,147,993 A * 9/1964 Broderson et al. ............ 294/198
3,431,662 A * 3/1969 Bles ................................ 37/264
5,073,080 A 12/1991 Blum
5,209,537 A * 5/1993 Smith et al. ................... 294/111
5,375,348 A * 12/1994 Kishi ............................. 37/186
5,762,390 A * 6/1998 Gosselin et al. .............. 294/106
6,267,547 B1 7/2001 Lund
6,357,993 B1 3/2002 Burton
6,655,899 B1 12/2003 Emerson
7,207,610 B1 * 4/2007 Kauppila ...................... 294/198
7,223,062 B1 5/2007 Emerson
7,431,554 B2 10/2008 Westendorf et al.
7,540,545 B1 * 6/2009 Fetch ............................ 294/198
2004/0047719 A1 * 3/2004 Helms ........................... 414/739
2005/0121929 A1 * 6/2005 Greenhill et al. ............. 294/106
2010/0164243 A1 * 7/2010 Albin ............................ 294/106
2010/0239405 A1 * 9/2010 Tesinsky ....................... 414/686
* cited by examiner

*Primary Examiner* — Saul Rodriguez
*Assistant Examiner* — Gabriela Puig
(74) *Attorney, Agent, or Firm* — Absolute Technology Law Group, LLC

(57) ABSTRACT

A barrel placement device for a skid steer loader is comprised of an attachment plate which attaches to the front of a skid steer loader; tubular support members; and a plurality of barrel pincers with gears that allow the barrel pincers to move in unison with the use of a single hydraulic cylinder. The hydraulic cylinder has hydraulic lines which connect to the auxiliary controls of a skid steer loader allowing the barrel pincers to be controlled to grasp and release traffic barrels from the interior of the skid steer loader.

15 Claims, 4 Drawing Sheets

HIGHLY-EFFICIENT BARREL PLACEMENT DEVICE

CROSS-REFERENCE TO RELATED APPLICATIONS

None

FIELD OF INVENTION

The present invention relates to the field of vehicle attachments, and more particularly to an attachment for moving traffic barricades.

GLOSSARY

Figure 1:
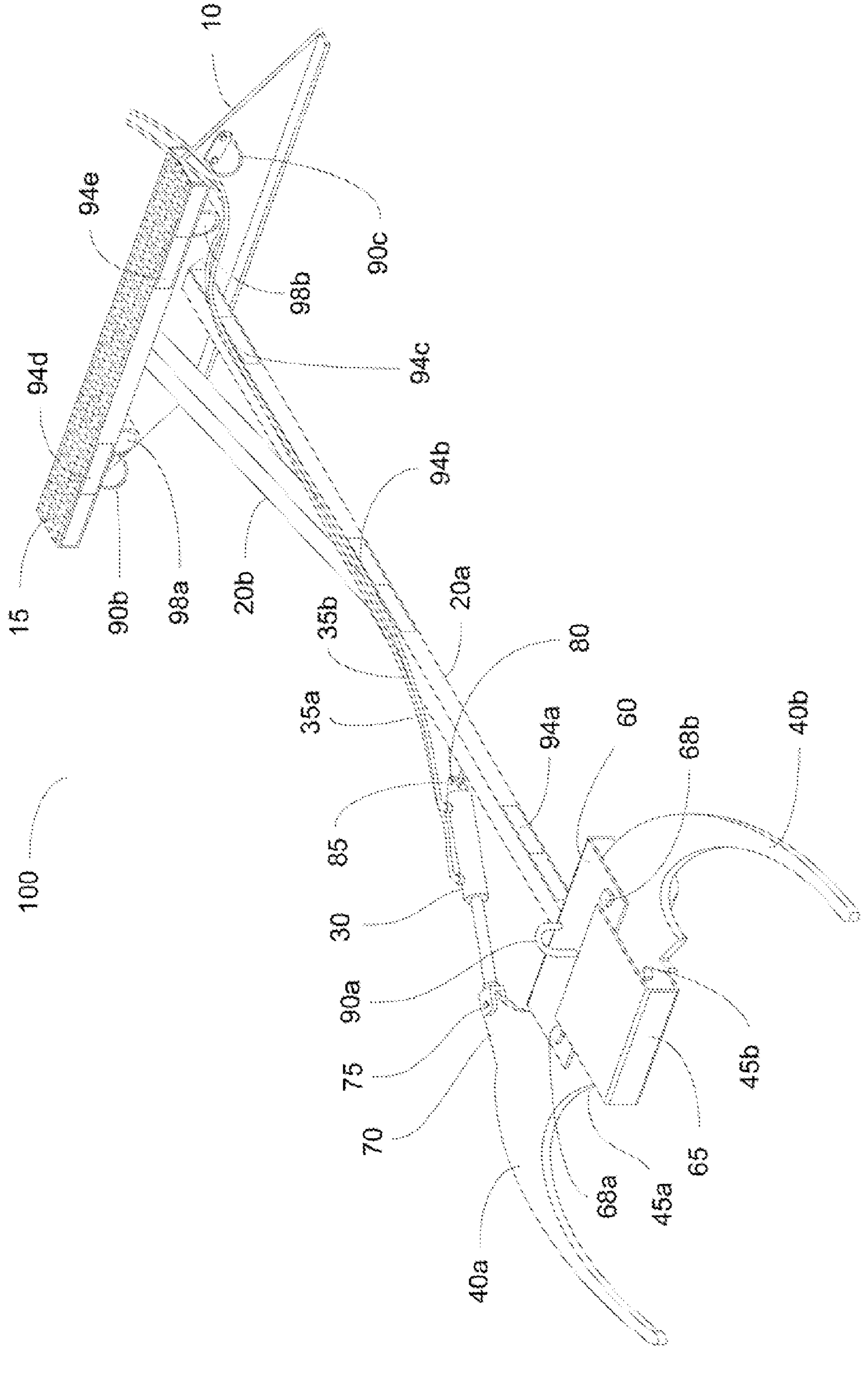
FIG. 1 illustrates a perspective view of an exemplary embodiment of a barrel placement device.

As used herein, the term “actuator” refers to a component that supplies and transmits a measured amount of energy to the operation of another component. Examples of actuators include, but are not limited to hydraulic cylinders, pneumatic actuators, electric actuators, motors, propellers, plasma actuators and linear actuators.

As used herein, the term “attachment plate” refers to a flat component which connects to the front of a skid steer loader or other vehicle.

As used herein, the term “axle holder” refers to a component that holds the barrel pincers in proper gear ratio.

As used herein, the term “bearing” refers to a component which allows constrained relative motion between two or more parts.

As used herein, the term “contoured” means shaped to engage the particular form of another component.

As used herein, the term “contoured barrel pressure lever” refers to the elongated curved portion of a barrel pincer which engages a barrel.

As used herein, the term “fastener” refers to a hardware component that mechanically joins or affixes two or more components together.

As used herein, the term “gear plate” refers to the portion of a barrel pincer having cut teeth of such form, size and spacing that they mesh with teeth in another gear plate to transmit or receive force and motion.

As used herein, the term “gear support structure” refers to a component which stabilizes and secures the gear plates.

As used herein, the term “gear teeth” refers to the projections of a gear plate which resemble a tooth in shape.

As used herein, the term “non-skid” means designed or constructed to prevent or reduce slipping.

As used herein, the term “skid steer loader” refers to a small rigid frame, engine-powered machine with lift arms that can be equipped with attachments for a variety of tasks.

As used herein, the term “strobe beacon” refers to a flashing light.

As used herein, the term “tie down” refers to a structural component which serves as an attachment point for straps used to secure an object during transport.

As used herein, the term “tractional component” means a component which increases the gripping capability of a contoured barrel pressure lever and which includes, but is not limited to a textured surface, raised surface, contours, protuberances, foam, rubber, spikes, and ridges.

As used herein, the term “traffic barrel” or “barrel” refers a cylindrical container generally constructed out impact-resistant polyethylene weighing approximately 25-40 pounds with a height of approximately 42.5 inches, a top diameter of approximately 18 inches and a bottom diameter of approximately 23.5 inches. A traffic barrel typically has 4 or 6 inch bands of reflective material. A barrel may further include a rubber base which adds additional weight.

As used herein, the term “tread step” refers to a component having a grooved or patterned surface which provides traction when entering and exiting a skid steer loader.

BACKGROUND

Each year millions of dollars are allocated for U.S. roads and highways to undergo road construction. Traffic barrels are typically used during road work to warn drivers, redirect traffic in the event of lane and ramp closures, and to protect workers. Due to the high traffic volume on some of these highways, lane and ramp closures are often restricted to evening hours when the volume of traffic is reduced.

Typically, traffic barrels are initially placed on the shoulder of the road, approximately 60 feet apart, and are later moved out onto the road. The task of moving the barrels onto the roadway is typically accomplished by a single individual who walks along the road, carrying/dragging each individual barrel from the shoulder onto the road. Traffic barrels generally weigh 25 pounds with a weighted base adding 10 to 40 additional pounds. Because of the weight of the barrels and the distance that must be traveled, a strong, fit individual is required, limiting the number of workers capable of the task.

The conventional way of moving traffic barrels is not ideal for a number of reasons. First, there is a high risk of injury. Due to the high traffic volume on some of these highways, lane and ramp closures are often restricted to evening hours when the volume of traffic is reduced, requiring that the barrels be moved during non-daylight hours when the individual is less visible to passing motorists. In addition, the weight of the barrels and the number of barrels that typically need to be moved at one time involves a high risk of other types of injury, such as back injuries and repetitive motion injuries.

Having an individual manually move traffic barrels also has high economic costs. Traffic barrels typically cover miles of roadway for a single project, making the placement of the barrels extremely time consuming. In addition, actual road work will often not begin until the traffic barrels for the entire stretch of road have been placed, despite the necessary equipment and more skilled, high-paid workers waiting onsite. This further increases labor costs, as well as cuts down on the number of hours crews can work.

It is desirable to have device which allows for the more efficient placement of traffic barrels decreasing project delay.

It is further desirable to have a device for placement of traffic barrels which reduces the risk of injury.

It is further desirable to have a device for placement of traffic barrels which does not require a special skill or a high degree of physical strength and stamina.

It is further desirable to have a device for placement of traffic barrels which can be used with existing road construction equipment.

SUMMARY OF THE INVENTION

The present invention is a highly-efficient barrel placement device comprised of an attachment plate adapted to be positioned on the front of a vehicle; first and second barrel pincers, each having a contoured barrel pressure level integrally molded with a gear plate; and a hydraulic cylinder which moves at least one of the contoured barrel pressure levers so that the contoured barrel pressure levers exhert pressure to create a tractional force sufficient to lift a barrel.

The hydraulic cylinder has hydraulic lines which connect to a vehicle allowing the barrel pincers to be moved to grasp and release traffic barrels from the interior of the vehicle.

DETAILED DESCRIPTION OF INVENTION

For the purpose of promoting an understanding of the present invention, references are made in the text to exemplary embodiments of a highly-efficient barrel placement device, only some of which are described herein. It should be understood that no limitations on the scope of the invention are intended by describing these exemplary embodiments. One of ordinary skill in the art will readily appreciate that alternate but functionally equivalent materials, components and designs may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates a perspective view of an exemplary embodiment of barrel placement device 100 for moving traffic barrels 150 (not shown). Barrel placement device 100 is comprised of attachment plate 10, tread step 15, tubular members 20*a*, 20*b*, hydraulic cylinder 30 and barrel pincers 40*a*, 40*b*. In the embodiment shown, barrel pincers 40*a*, 40*b* are in an open position.

Barrel placement device 100 is attached to skid steer loader 200 (not shown) by securing attachment plate 10 to the front plate of skid steer loader 200 using the universal quick-tach system found on most skid steer loaders. Tread step 15 provides traction when entering and leaving skid steer loader 200.

Tubular member 20*a* is welded to approximately the center of attachment plate 10 at one end and axle holder 60 at the other. In the embodiment shown, axle holder 60 is a U channel having a set of apertures 62*a*, 62*b* (not shown) aligned on each half of axle holder 60. Barrel pincers 40*a*, 40*b* have corresponding gears 45*a*, 45*b* and apertures 42*a*, 42*b*. Gears 45*a*, 45*b* of barrel pincers 40*a*, 40*b* are placed inside axle holder 60 and secured by fasteners 68*a*, 68*b*. Axle holder 60 and fasteners 68*a*, 68*b* hold barrel pincers 40*a*, 40*b* in proper gear ratio.

Axle cover 65 is placed over the axle holder 60 from the front hiding gears 40*a*, 40*b* and protecting them from damage and from being knocked out of gear. In the embodiment shown, axle cover 65 is a U channel that is welded to axle holder 60. In other embodiments, axle cover 65 can be secured to axle holder 60 using fasteners or another means known in the art.

Barrel pincer 40*a* further includes hydraulic cylinder attachment point 70 having aperture 72 (not shown) for securing hydraulic cylinder 30 to barrel pincer 40*a*. Tubular member 20*a* further includes hydraulic cylinder attachment point 80 having aperture 82 (not shown) for securing the second end of hydraulic cylinder 30. Hydraulic cylinder 30 is attached to attachment points 70, 80 by fasteners 75, 85.

In the embodiment shown, hydraulic cylinder attachment point 70 is integrally constructed with barrel pincer 40*a*; however, in other embodiments may be a separate component attached to barrel pincer 40*a* by welding or another means known in the art. In the embodiment shown, hydraulic cylinder attachment point 80 is welded to tubular member 20*a*; however, in other embodiments, hydraulic cylinder 30 may be integrally constructed with tubular member 20*a* or attached by means other than welding.

Hydraulic cylinder 30 has hydraulic lines 35*a*, 35*b* which attach to the auxiliary hydraulic attachment points of a skid steer loader allowing barrel pincers 40*a*, 40*b* to be controlled using the skid steer loader auxiliary controls (e.g., joystick control). In other embodiments, barrel placement device 100 may further include components, such as clamps, for securing hydraulic lines 35*a*, 35*b* to restrict movement and prevent damage.

In other embodiments, hydraulic cylinder 30 may be located in another location or barrel placement device 100 may have another type of actuator including, but not limited to pneumatic actuators, electric actuators, motors, propellers, plasma actuators and linear actuators. In still other embodiments, barrel placement device 100 may include more than one actuator.

The skid steer loader auxiliary controls control hydraulic cylinder 30, which moves barrel pincer 40*a*. When barrel pincer 40*a* moves, barrel pincer 40*a* pivots and gear 40*a* pivots along gear 45*b* of barrel pincer 40*b* causing barrel pincer 40*b* to move in conjunction with barrel pincer 40*a*. Gears 45*a*, 45*b* allow barrel pincers 40*a*, 40*b* to open and close to grasp and release a barrel using only a single hydraulic cylinder.

In the embodiment shown, fasteners 68*a*, 68*b*, 75, 85 are comprised of a nut and bolt; however, in other embodiments, fasteners may be a pin, clamp, other securing component known in the art, or combinations thereof.

Figure 2:
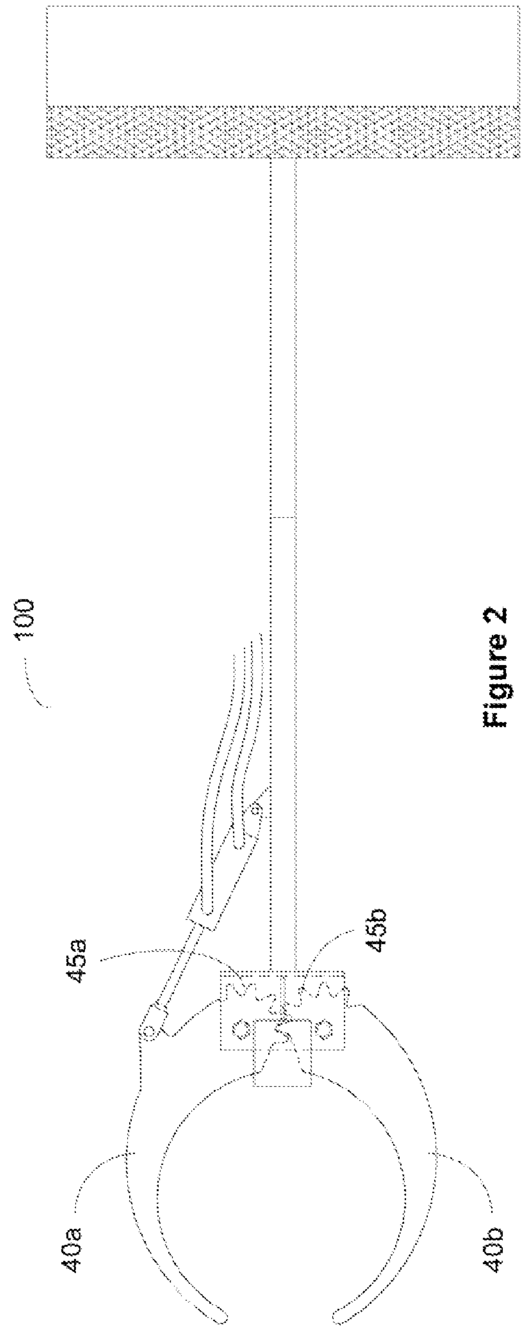
FIG. 2 illustrates a top view of an exemplary embodiment of a barrel placement device.

In the embodiment shown, barrel pincers 40*a*, 40*b* are capable of pivoting from zero (closed position as shown in FIG. 2) to 230 degrees (open position as shown in FIG. 1); however, in other embodiments, barrel pincers 40*a*, 40*b* may be capable of pivoting a smaller or larger number of degrees.

In the embodiment shown, tubular members 20*a*, 20*b* are comprised of steel and are hollow with a square cross section. In other embodiments, tubular members 20*a*, 20*b* may be comprised of another material, such as plastic, and/or have a cross section of another shape, such as rectangular or circular.

In the embodiment shown, tubular member 20*a* is 8 feet in length, but in other embodiments may be 6 inches to 12 feet in length, and may be telescoping to allow for length adjustment. IN still other embodiments, tubular member 20*a* may further include a joint and a hydraulic, electrical, pneumatic, or mechanical actuator which allows tubular member 20*a* to rotate, rotating the position of barrel pincers 40*a*, 40*b* to allow barrel placement device 100 to more easily grasp a barrel which is turned on its side.

In the embodiment shown, tubular member 20*b* is welded near the top of the front side of attachment plate 10 below tread step 15. The other end of tubular member 20*b* is welded to tubular member 20*a* providing additional structural support to barrel placement device 100. In other embodiments, additional support members may be included. For example, barrel placement device 100 may further include tubular members which extend from tubular member 20*a* to the sides of attachment plate 10.

In the embodiment shown, barrel placement device 100 further includes optional tie downs 90*a*, 90*b*, 90*c*, optional reflectors 94*a*, 94*b*, 94*c*, 94*d*, 94*e* and optional utility lights 98*a*, 98*b*.

In the embodiment shown, tie down 90*a* is a D-ring secured to axle holder 60 and tie downs 90*b*, 90*c* are D-rings secured near the edges of attachment plate 10. Tie downs 90*a*, 90*b*, 90*c* provide attachment points for tie down straps used to secure barrel placement device 100 during transport (e.g., in the bed of a truck).

In the embodiment shown, reflectors 94*a*, 94*b*, 94*c* are located along tubular member 20*a* and reflectors 94*d*, 94*e* and utility lights 98*a*, 98*b* are located on the front of attachment plate 10. Reflectors 94 and utility lights 98 increase the visibility of barrel placement device 100, particularly when used at night. In other embodiments, barrel placement device may contain a smaller or greater number of reflectors and/or lights in varying locations. For example, a strobe beacon may be placed on the top of axle holder 60 to further increase the visibility of barrel placement device 100.

In other embodiments, barrel pincers 40*a*, 40*b* may further include padding to protect traffic barrel 150 and/or barrel pincers 40*a*, 40*b*, or a tractional component that increases the gripping capability of barrel pincers 40*a*, 40*b*. A tractional component may include, but is not limited to a textured surface, raised surface, contours, protuberances, foam, rubber, spikes, ridges, or any other material or configuration which increases traction. In various embodiments, padding or a tractional component may be placed only along the inner edge of barrel pincers 40*a*, 40*b* or may cover additional portions of barrel pincers 40*a*, 40*b* (e.g., the upper surface).

In various other embodiments, barrel placement device 100 may include more than two barrel pincers. For example, barrel placement device 100 may have two barrel pincers on one side and a single barrel pincer on the opposite side that is vertically positioned between the two barrel pincers on the first side.

FIG. 2 illustrates a top view of an exemplary embodiment of barrel placement device 100 showing gears 45*a*, 45*b* each having 5 uniform teeth. In the embodiment shown, barrel pincers 40*a*, 40*b* are in a closed position. In other embodiments, gears 45*a*, 45*b* may have more or fewer uniform or non-uniform teeth.

Figure 3:
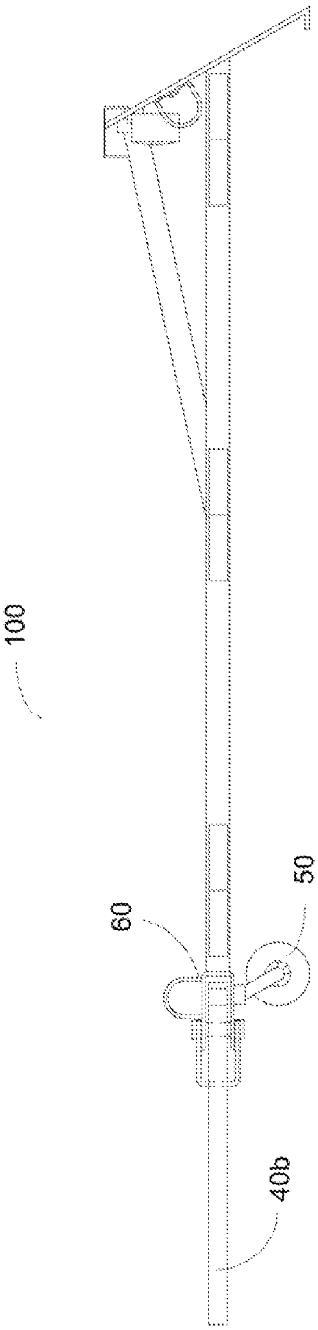
FIG. 3 illustrates a side view of an exemplary embodiment of a barrel placement device.

FIG. 3 illustrates a side view of an exemplary embodiment of barrel placement device 100 showing includes swivel caster wheel 50. In the embodiment shown, swivel caster wheel 50 is welded to the bottom of axle holder 60 and is capable of rotating 360 degrees. Swivel caster wheel keeps barrel pincers 40*a*, 40*b* from scraping the ground preventing damage to barrel pincers and 40*a*, 40*b* and other property. In other embodiments, swivel caster wheel 50 may be secured using fasteners or another means known in the art and/or may be secured in another location (e.g., to the bottom of tubular member 20*a*).

In various embodiments, the thickness of barrel pincers 40*a*, 40*b* may range from 8 to 35 millimeters.

Figure 4:
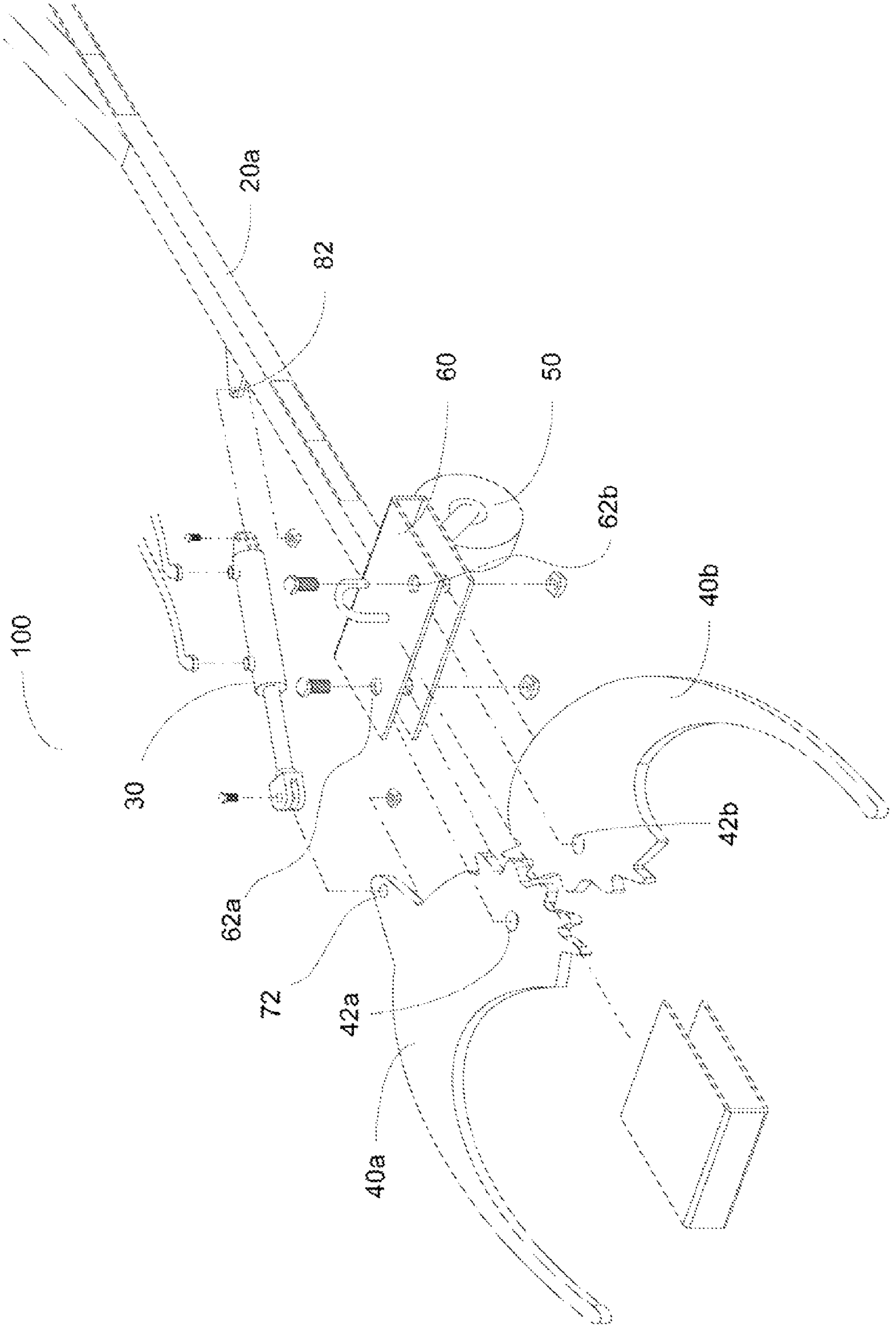
FIG. 4 illustrates an exploded view of an exemplary embodiment of a barrel placement device.

FIG. 4 illustrates an exploded view of an exemplary embodiment of barrel placement device 100.

Figure 5:
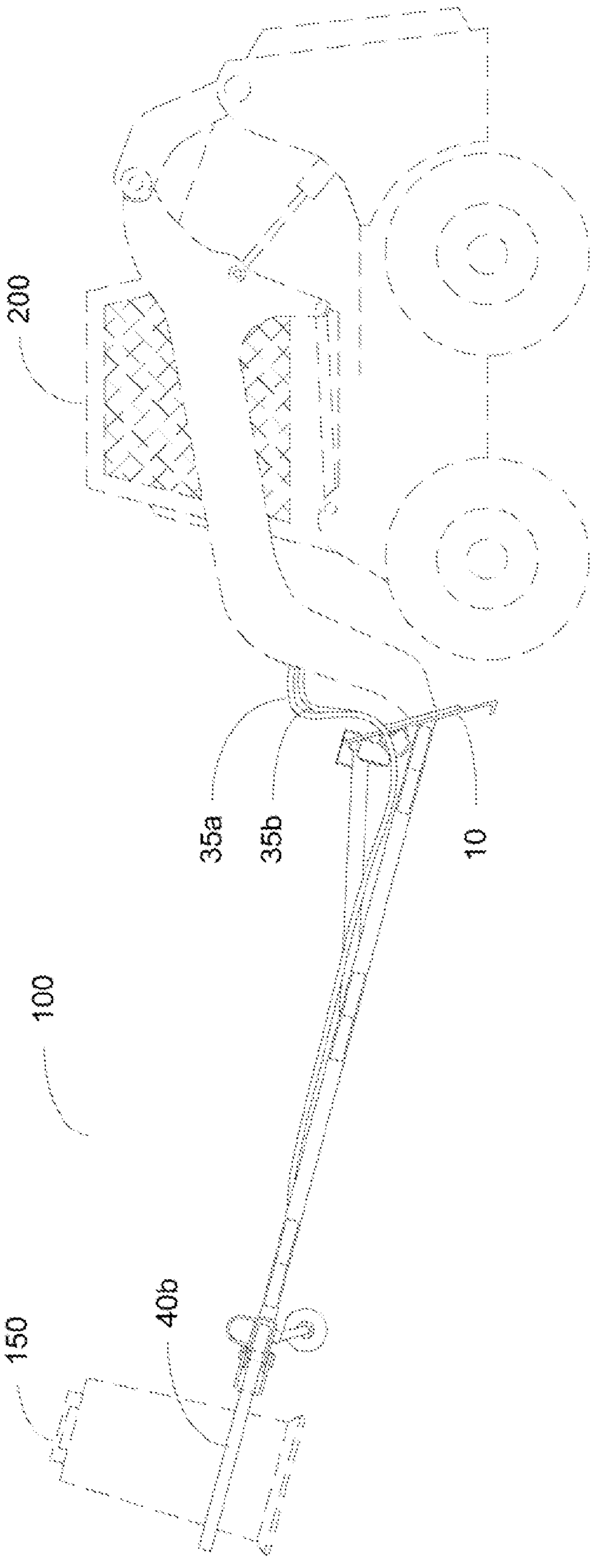
FIG. 5 illustrates a side view of an exemplary embodiment of a barrel placement device in use with a skid steer loader.

FIG. 5 illustrates a side view of an exemplary embodiment of barrel placement device 100 in use with a skid steer loader 200. In the embodiment shown, barrel pincers 40*a*, 40*b* are closed around traffic barrel 150. Barrel pincers 40*a*, 40*b* are controlled using the auxiliary controls of skid steer loader 200 and are the only movable components of barrel placement device 100.

To pick up traffic barrel 150, barrel pincers 40*a*, 40*b* are opened, placed around traffic barrel and then closed. Traffic barrel 150 can be moved horizontally (e.g., from the shoulder of a road onto the road) by moving or rotating skid steer loader 200. Traffic barrel 150 can also be moved vertically, as shown in FIG. 5, by lifting or lowering the boom or bucket of the skid steer loader.

In other embodiments, barrel placement device 100 can be used to move other items, such as hay bales, or be used for other projects, such as removing or setting fence posts.

What is claimed is:

1. A system for repositioning a traffic obstruction comprised of:

- a traffic barrel having a tapered cylindrical body with a top diameter of approximately 18 inches and a bottom diameter of approximately 23.5 inches and weight in excess of 25 pounds;
- a traffic obstruction repositioning device comprised of:
  - an attachment plate with tread step adapted to engage a mounting structure positioned on the front surface of a vehicle to selectively attach said barrel placement device to said vehicle;
  - a first contoured barrel pressure lever containing a first gear plate with a first gear plate aperture and an actuator attachment point;
  - a second contoured barrel pressure lever containing a second gear plate with a second gear plate aperture, wherein said first gear plate and said second gear plate have corresponding gear teeth adapted to alternately engage each other;
  - wherein said first gear plate aperture and said second gear plate aperture are adapted to receive a bearing around which said gear plates may pivot from zero to 230 degrees;
  - wherein said first contoured barrel pressure lever and said second contoured barrel pressure lever are crescent-shaped members each having an inner traffic barrel engaging surface which is tapered to match the corresponding tapered cylindrical body of said traffic barrel;
- an axle holder having a U-shaped gear plate channel and a first and second securing aperture corresponding to said first and second gear plate apertures of said gear plates, wherein a fastener extending through each of said first securing aperture and gear plate aperture and said second securing aperture and gear plate aperture aligns said gear teeth in proper gear ratio;
  - an axle cover having a U-shaped channel adapted to receive said first gear plate, said second gear plate and said axle holder;
  - at least one connecting member attached at a first end to said attachment plate and at a second end to said axle holder, wherein said connecting member further includes at least one actuator attachment point;
  - at least one actuator connected to said at least one connecting member at said actuator attachment point and said first contoured barrel pressure lever at said actuator attachment point and which moves said first contoured barrel pressure lever, causing said second contoured barrel pressure lever to move in conjunction with said first contoured barrel pressure lever by the engagement of said corresponding gear teeth, so that said first contoured barrel pressure lever and second contoured barrel pressure lever exert pressure to create a tractional force sufficient to lift said barrel; and a plurality of D-shaped rings secured to said axle holder and said attachment plate.

2. The system of claim 1 which further includes least one hydraulic cylinder and at least two hydraulic lines adapted to attach to an auxiliary hydraulic attachment point of a vehicle.

3. The system of claim 1 wherein said actuator is selected from a group consisting of hydraulic actuators, mechanical actuators, pneumatic actuators, and electrical actuators.

4. The system of claim 1 wherein each of said first gear plate is integrally molded with said first contoured barrel pressure lever and said second gear plate is integrally molded with said second contoured barrel pressure lever.

5. The system of claim 1 wherein each of said gear plates includes between 4 and 10 uniformly sized gear teeth.

6. The system of claim 1 wherein said gear plates have a thickness between 8 millimeters and 35 millimeters.

7. The system of claim 1 wherein said at least one connecting member is tubular.

8. The system of claim 1 wherein said at least one connecting member is a horizontal connecting member.

9. The system of claim 1 which further includes at least one angled connecting member.

10. The system of claim 1 wherein said connecting member has a length of 8 feet.

11. The system of claim 1 which further includes at least one wheel adapted to prevent said first contoured pressure lever and said second contoured pressure lever from scraping the ground during transport of said apparatus.

12. The system of claim 1 wherein said connecting member is telescoping.

13. The system of claim 1 which further includes at least one tractional component.

14. The system of claim 1 wherein said inner traffic barrel engaging surface includes a tractional component selected from a group consisting of a textured surface, a raised surface, contours, protuberances, foam, rubber, spikes, and ridges.

15. A barrel grasping gear plate system comprised of:

a traffic barrel having a tapered cylindrical body with a top diameter of approximately 18 inches and a bottom diameter of approximately 23.5 inches and weight in excess of 25 pounds;

a barrel grasping apparatus comprised of two gear plates with gear teeth, each having an aperture adapted to receive a bearing around which said gear plates may pivot from zero to 230 degrees, and two contoured barrel pressure levers, each integrally constructed with one of said gear plates, said contoured barrel pressure levers having a progressive radius and an inner edge which forms a tractional contact with the outside surface of said barrel, said contoured barrel pressure levers further having a shape which geometrically conforms to said external diameter of said barrel so that said inner edge of said contoured barrel pressure levers may form said tractional contact;

an axle holder having a U-shaped gear plate channel and two securing apertures, each corresponding to one of said gear plate apertures creating corresponding aperture sets, wherein a fastener extending through each of said corresponding aperture sets aligns said gear teeth in proper gear ratio;

an axle cover having a U-shaped channel adapted to receive said gear plates and said axle holder;

an attachment plate adapted to engage a mounting structure positioned on the front surface of a vehicle to selectively attach said barrel grasping apparatus to said vehicle;

at least one connecting member attached at a first end to said attachment plate and at a second end to said axel holder, wherein said connecting member further includes at least one actuator attachment point;

at least one actuator connected to said at least one connecting member at said actuator attachment point and to one of said contoured barrel pressure levers at an actuator attachment point, wherein activation of said actuator causes said one of said contoured barrel pressure levers to pivot and engage said gear teeth so that the other of said contoured barrel pressure levers moves in conjunction with said one of said contoured barrel pressure levers.

* * * * *